United States Patent [19]

Arkles

[11] E Patent Number: Re. 33,070

[45] Reissued Date of Patent: Sep. 26, 1989

[54] CURABLE SILICONE CONTAINING COMPOSITIONS AND METHODS OF MAKING SAME

[75] Inventor: Barry C. Arkles, Ambler, Pa.

[73] Assignee: Petrarch Systems Inc., Bristol, Pa.

[21] Appl. No.: 16,158

[22] Filed: Feb. 18, 1987

Related U.S. Patent Documents

Reissue of:

[64] Patent No.: 4,500,688
Issued: Feb. 19, 1985
Appl. No.: 370,000
Filed: Apr. 20, 1982

[51] Int. Cl.[4] ..... C08L 59/00; C08L 69/00; C08L 83/05; C08L 75/04

[52] U.S. Cl. ..... 525/431; 525/106; 525/440; 525/453; 525/464; 525/472; 525/478

[58] Field of Search ..... 525/464, 431, 453, 440, 525/472, 106, 478

[56] References Cited

U.S. PATENT DOCUMENTS

| | | | |
|---|---|---|---|
| 3,288,879 | 11/1966 | Safford | 525/105 |
| 3,350,337 | 10/1967 | Campbell | 525/106 |
| 3,463,662 | 8/1969 | Hodes | 525/453 |
| 3,642,936 | 2/1972 | Hodge et al. | 525/101 |
| 3,715,334 | 2/1973 | Karstedt . | |
| 3,775,452 | 11/1973 | Karstedt | 528/15 |
| 3,956,419 | 5/1976 | Murray | 526/84 |
| 3,960,985 | 6/1976 | Cooper | 525/106 |
| 4,164,491 | 8/1979 | Itoh et al. | 525/440 |
| 4,201,698 | 5/1980 | Itoh et al. | 525/453 |
| 4,202,807 | 5/1980 | Moretto et al. | 525/453 |
| 4,265,801 | 5/1981 | Moody et al. | 525/453 |
| 4,302,553 | 11/1981 | Frisch et al. | 525/453 |

FOREIGN PATENT DOCUMENTS

| | | | |
|---|---|---|---|
| 138555 | 11/1979 | Fed. Rep. of Germany | 525/453 |
| 39349 | 12/1972 | Japan . | |
| 99135 | 9/1974 | Japan . | |
| 112453 | 9/1975 | Japan . | |
| 122161 | 10/1976 | Japan . | |
| 9223 | 3/1977 | Japan . | |
| 41704 | 10/1980 | Japan . | |
| WO82/02204 | 7/1982 | PCT Int'l Appl. | 525/105 |

OTHER PUBLICATIONS

L. H. Sperling "Interpenetrating Polymer Networks & Related Materials," Plenum Press, N.Y., and London, 1981 Chapter 1, pp. 3–5.

W. Noll, Chemie und Technologie der Silicone, 2nd Edition, 1968, pp. 317, 318, 321, 363.

*Primary Examiner*—Wilbert J. Briggs, Sr.

*Attorney, Agent, or Firm*—Panitch Schwarze Jacobs & Nadel

[57] ABSTRACT

A melt processable pseudointerpenetrating network of silicones in thermoplastic matrices and a method of producing same is provided by vulcanizing the silicones within the matrices. In a preferred embodiment a two part silicone comprising silicon hydride groups and silicon vinyl-containing groups are reacted in the presence of a platinum complex. Depending on certain parameters chain-extended (thermoplastic) or cross-linked (thermosetting) compositions are produced.

29 Claims, No Drawings

CURABLE SILICONE CONTAINING COMPOSITIONS AND METHODS OF MAKING SAME

Matter enclosed in heavy brackets [ ] appears in the original patent but forms no part of this reissue specification; matter printed in italics indicates the additions made by reissue.

BACKGROUND OF THE INVENTION

This invention concerns compositions which can be described as melt processable pseudointerpenetrating networks of silicones in thermoplastic matrices. This invention also relates to methods for the formation of these compositions.

Previous investigations have demonstrated that silicones may be incorporated into thermoplastic resins at low levels in order to enhance wear friction and release properties. These silicones, however, are low molecular weight resins which are readily extractable from the matrix resins. Incorporation of silicone at levels above 2% and in some cases even between about 0.1% and 2% can cause catastrophic reductions in mechanical properties and melt rheology. The present invention reveals that judiciously selected silicone systems which are vulcanized within a thermoplastic matrix to form pseudointerpenetrating polymer networks will not adversely affect polymer properties.

SUMMARY OF THE INVENTION

There have now been discovered new compositions comprising a silicone component vulcanized within a polymeric thermoplastic matrix to form a pseudointerpenetrating polymer.

This invention is also directed to methods of producing pseudointerpenetrating silicone polymers by curing or vulcanizing a silicone within a polymeric thermoplastic matrix at elevated temperatures.

Advantageous characteristics of the compositions of this invention are surface and dielectric properties which approach those of silicones and mechanical properties which approach those of the thermoplastic matrices.

DETAILED DESCRIPTION OF THE INVENTION

The compositions of this invention are formed by the catalyzed curing or vulcanization of a silicone in a compatible polymeric thermoplastic matrix at elevated temperature. A silicone is any of a large group of siloxane polymers based on a structure comprising alternate silicone and oxygen atoms with various organic radicals attached to the silicon.

The amount of silicone in the resultant compositions of the present invention can range from between about 1 weight percent and about 40 weight percent.

Vulcanization (curing) can be defined as any treatment that decreases the flow of an elastomer, increases its tensile strength and modulus, but preserves its extensibility. These changes are generally brought about by the cross-linking reactions between polymer molecules, but for purposes of this invention vulcanization is used in a broader sense to include chain extension as well as cross-linking reactions.

The polymeric thermoplastic matrices of this invention are conventional thermoplastic resins including, but not limited to polyamides, thermoplastic polyurethanes, bisphenol A polycarbonates, styrenics, polyacetals, etc.

In a particular embodiment of this invention a two part vulcanizing silicone which, depending on molecular structure will undergo predominantly chain extending or cross-linking reactions, is vulcanized in a suitable thermoplastic matrix. One polymeric silicone component of the two part silicone contains silicone hydride (Si—H) groups. The other polymeric component contains unsaturated groups, preferably vinyl. Non-limiting examples of other unsaturated groups that can be employed include allyl—$CH_2CH{=}CH_2$ and hexenyl—$(CH_2)_4CH{=}CH_2$. Alternatively, both the hydride and unsaturated group can be part of one polymeric silicone. In the presence of a catalyst, generally a platinum complex, silicon hydride adds to the unsaturated group, e.g., a vinyl group, to create an ethylene linkage as follows:

$$\equiv Si{-}H + CH_2{=}CH{-}Si\equiv \xrightarrow{Pt} \equiv Si{-}CH_2CH_2Si\equiv$$

The principles of this chemistry are well-known to those skilled in the art.

Vinyl containing polymers that can be employed in the present invention have viscosity ranges of between about 500 and about 100,000 ctsk, with polymers having viscosities of between about 1000 and about 65,000 ctsk preferred. Hydride containing polymers that can be utilized in the present invention have viscosities of between about 35 and about 10,000 ctsk, with a preferred viscosity range of between about 500 ctsk and about 1,000 ctsk. Molecular weights are correlated to viscosity. Thus a vinyl terminated polymer having a viscosity of 1,000 ctsk has a molecular weight of 28,000.

In a preferred embodiment of this invention pellets are formed of the compositions of this invention. These pellets can be readily utilized for injection molding or extrusion. The pellets may either contain silicones which have been vulcanized or contain all the materials necessary to form the vulcanizate during injection molding or extrusion.

The silicones of this invention will generally undergo one of two types of mechanisms, namely, chain-extension or cross-linking. The silicones which during vulcanization undergo primarily chain-extension yield thermoplastic components (plastics capable of being repeatedly softened by increases in temperature and hardended by decreases in temperature). Silicones which undergo primarily cross-linking during vulcanization yield compositions that have thermosetting properties (resins which cure by chemical reaction when heated and, when cured, cannot be resoftened by heating).

In the case of the predominantly chain-extended or thermoplastic compositions of this invention, a thermoplastic resin is combined with silicone components including a hydride-containing silicone and a vinyl silicone. The vinyl silicone generally contains from about two to about four vinyl groups, preferably with two such groups in terminal positions. The hydride-containing silicone contains 1 to 2 times the equivalent of the vinyl functionality. The two silicones are mixed in a ratio so that the hydride groups to vinyl groups is between about 1.2:1 and about 6:1.

Theoretically only a 1:1 ratio is necessary, but it has been found that a higher ratio as indicated above is required. The silicone hydride polymers are not as stable as the silicone vinyl polymers. In the presence of amines or hydroxyls, the silicone hydrides can react and liberate hydrogen thus yielding SiN≡ or Si—OR. Thus the simplest practical solution to this problem is to maintain hydride levels higher than stoichiometric requirements.

The typical remaining substituents on the silicones are methyl groups. However, in order to insure compatability with the thermoplastic matrix resin other groups such as phenyl, longer chain alkyl or cyanopropyl groups may replace some of the methyl groups.

A platinum complex preferably derived from chloroplatinic acid and a vinyl siloxane is added to the mixture just prior to meltmixing so that the amount of platinum is equal to 1–15 ppm. The vinyl siloxane forms an active complex with the platinum which is soluble in the silicones to be cross-linked. The mixture is meltmixed by a process such as extrusion and is then pelletized.

A predominantly cross-linked structure in which the resulting composition has thermosetting properties is achieved by extruding the vinyl and hydride containing silicones separately into two portions of the base polymer. The vinyl-containing silicone contains from about two to about thirty vinyl groups and the hydride-containing silicone contains from two to ten times the equivalent of the vinyl functionality. In this case the hydride functional silicone is the cross-linker since it contains a relatively higher number of sites per chain for cross-linking. The relationship of these two materials can, however, be reversed. The ultimate ratio of the silicones is adjusted in either case so that the ratio of the hydride groups to the vinyl groups in the composition is between about 1.2:1 and about 6:1.

Once the separate extrusions are prepared, a physical blend of the pellets is made. A platinum complex is then tumbled into the mixture. When the pellets are melted together the silicones react. Most of the thermosetting reaction takes place during injection molding or extrusion of the mixture and may be completed during a post-cure. A number of permutations of the above are evident to those skilled in the art. One component pellet could contain for example predominantly vinyl silicone with some of the hydride silicone. In some instances the two polymers do not have to be isolated prior to melt mixing. In fact, vinyl groups and hydride groups can be on the same chain. Having the materials on separate pellets reduces (or eliminates) surface cure of the pellets. Another solution to this problem would be to use a fugitive inhibitor of the platinum catalyst.

The invention is further described by reference to the following specific, non-limiting examples.

EXAMPLE 1

A homogeneous physical blend of the following materials was prepared:

| | |
|---|---|
| nylon 6/6, Monsanto molding grade pellets | 9000 g |
| polydimethylsiloxane, vinyldimethylsiloxy terminated, 10,000 ctsk. | 400 g |
| polydimethylsiloxane, hydrodimethylsiloxy terminated, average of 1 hydromethylsiloxy group per chain, 10,000 centistokes (ctsk) | 600 g |

Within one hour of extrusion, 1 g of a platinum complex in methylvinylcyclosiloxane containing 3.5% Pt was added to the mixture. The platinum complex utilized throughout the examples were the methylvinyl cyclic siloxane analogs of the Karstedt U.S. Pat. Nos. 3,715,334 and 3,775,452. The mixture was extruded at 340°–355° C. and chopped into pellet form. The pelletized composition was molded into standard ASTM specimens. The ASTM testing protocol was used for flexural strength, tensile strength and water absorption. Properties of the resultant composition are tabulated in the Table hereinbelow.

EXAMPLE 2

Utilizing the same silicones as described in Example 1 a moldable thermoplastic urethane/silicone composition was prepared.

| | |
|---|---|
| polyester urethane, Mobay Texin 55D | 9250 g |
| polydimethylsiloxane, vinyl terminated | 300 g |
| polydimethylsiloxane, hydride containing | 450 g |
| fumed silica, Cabot MS-7 | 5 g |
| platinum complex (added after extrusion) | 1 g |

Fumed silica served both as a reinforcing agent and a process aid. In this example, feed problems were observed and the fumed silica absorbed the silicone making it easier to process. The properties of specimens prepared from the above described pelletized extruded material are tabulated in the Table hereinbelow.

EXAMPLE 3

The following composition was extruded and molded:

| | |
|---|---|
| polyester urethane Mobay Texin 480A | 9000 g |
| polydimethylsiloxane-3% diphenylsiloxane copolymer, vinyldimethylsiloxy terminated | 400 g |
| polydimethylsiloxane, hydride containing | 600 g |
| platinum complex (added after extrusion) | 1 g |

Properties of the composition formed according to Example 3 are given in the Table hereinbelow.

EXAMPLE 4

The following composition was extruded and molded:

| | |
|---|---|
| bisphenol A polycarbonate, Mobay M-50 | 9500 g |
| polydimethylsiloxane-10% phenylmethyl siloxane copolymer, vinyldimethylsiloxy terminated | 200 g |
| polydimethylsiloxane, hydride containing | 300 g |
| platinum complex (added after extrusion) | 1 g |

Properties of the composition formed according to Example 4 are given in the Table hereinbelow.

EXAMPLE 5

The following mixtures were extruded then pelletized:

| | |
|---|---|
| Part A | |
| polyester urethane, Mobay Texin 480A | 9000 g |
| polydimethylsiloxane-15% methylhydrosiloxane copolymer, trimethylsiloxy terminated 10,000 ctsk | 500 g |
| polydimethylsiloxane, vinyldimethylsiloxy terminated 65,000 ctsk | 500 g |
| amorphous silica, Minusil | 50 g |
| Part B | |
| polyester urethane, Mobay Texin 480A | 8800 g |
| polydimethylsiloxane, vinyl terminated | 1200 g |

-continued

| | |
|---|---|
| 65,000 ctsk amorphous silica | 25 g |

Part A and Part B were extruded separately. A 1:1 (weight ratio) physical blend of two different extrusions was made. 2.5 g of platinum complex and 5 g of 3-methylbutynol, a fugitive inhibitor of hydrosilylation (hydrosilylation is the process of adding Si-H across a double bond) were tumbled into the mixture and prior to hermetically sealing it in a can.

The mixture was molded under normal conditions and post-cured an additional 1 hour at 80° C.

The present invention may be embodied in other specific forms without departing from the spirit or essential attributes thereof and, accordingly, reference should be made to the appended claims, rather than to the foregoing specification, as indicating the scope of the invention.

TABLE

| Properties | Examples 1 | 2 | 3 | 4 | 5 |
|---|---|---|---|---|---|
| Thermoplastic base | Nylon 6/6 | Urethane 55D | Urethane 80A | Polycarbonate | Urethane 80A |
| Predominant Melt Characteristics | Thermoplastic | Thermoplastic | Thermoplastic | Thermoplastic | Thermoset |
| % Silicone | 10 | 7.5 | 10 | 10 | 11 |
| Flexural Strength, psi | 15,900 | 730 | | 11,000 | |
| Flexural modulus, psi | 390,000 | — | | 325,000 | |
| Izod impact strength, ft-lb/in | | | | | |
| notched | 0.8 | >40 | | >40 | |
| unnotched | 21.3 | >40 | | 16 | |
| Water absorption % (24 hours) | 1.2 | .03 | .04 | .15 | .04 |
| Tear Strength ("C"), pli | | 750 | 450 | | 500 |
| Tensile Strength, psi | 9,600 | | 6200 | | 6.000 |

I claim:

[1. A melt processable composition comprising a silicone component which will be vulcanized by the reaction of a hydride-containing silicone within a polymeric thermoplastic matrix to form a silicone pseudointerpenetrating polymer network, said vulcanization of said silicone component by reaction of said hydride-containing silicone being initiated during thermoplastic meltmixing of said component with said matrix.]

[2. A composition according to claim 1 wherein said silicone component ranges from between about 1 weight percent and about 40 weight percent based on the total weight of the composition.]

[3. A composition according to claim 1 wherein aid thermoplastic matrix is selected from the group consisting of polyamides, thermoplastic polyurethanes, bisphenol A polycarbonates, and polyacetals.]

[4. A composition according to claim 1 wherein said silicone component comprises the reaction product of a polymeric hydride group-containing silicone and polymeric silicone containing at least one unsaturated group.]

[5. A composition according to claim 4 wherein said unsaturated group comprises a vinyl group.]

[6. A composition according to claim 5 forming a predominantly chain-extended structure wherein said vinyl-containing silicone contains from about two to about four vinyl groups and wherein said hydride-containing silicone contains 1 to 2 times the equivalent of said vinyl-containing silicone with the ratio of said hydride groups to said vinyl groups being between about 1.2:1 and about 6:1.]

[7. A composition according to claim 5 wherein the vinyl-containing silicone has two vinyl groups in terminal positions.]

[8. A composition according to claim 5 forming a predominantly cross-linked structure wherein said vinyl-containing silicone contains from about two to about thirty vinyl groups and said hydride-containing silicone contains from two to ten times the equivalent of said vinyl-containing silicone with the ratio of the hydride groups to the vinyl groups being between about 1.2:1 and about 6:1.]

[9. A composition according to claim 4 wherein said silicone component further comprises constituents selected from the group consisting of methyl groups, phenyl groups, longer chain alkyl groups or cyanopropyl groups.]

10. A method for producing a silicone pseudointerpenetrating polymer network comprising vulcanizing a silicone component by the reaction of a hydride-containing silicone within a polymeric thermoplastic matrix at least partially during thermoplastic [meltmixing] *melt-processing* of said silicone component [with] *and* said matrix.

11. A method according to claim 10 wherein said silicone component is the reaction product of a polymeric silicone containing hydride groups and a polymeric silicone containing at least one unsaturated group, said reaction conducted in the presence of a catalyst.

12. A method according to claim 11 wherein said unsaturated group is a vinyl group.

13. A method according to claim 11 wherein said catalyst comprises a platinum complex.

14. A method according to claim 10 wherein said thermoplastic matrix is selected from the group consisting of polyamides, thermoplastic polyurethanes, bisphenol A polycarbonates, and polyacetals.

15. A method according to claim 10 wherein a predominantly chain-extended structure is formed by combining a hydride-containing silicone and a vinyl-containing silicone with the vinyl-containing silicone having from about two to about four vinyl groups and the hydride-containing silicone contains 1 to 2 times the equivalent of the vinyl functionality with the ratio of the hydride groups to the vinyl groups being between about 1.2:1 and 6:1, adding a catalyst and [melt-mixing] *melt-processing* the resultant mixture.

16. A method according to claim 15 wherein said [meltmixing] *melt-processing* comprises extrusion.

17. A method according to claim 15 wherein said [meltmixing] *melt-processing* is followed by pelletizing.

18. A method according to claim 11 further comprising conducting the reaction in the presence of fumed silica.

19. A method according to claim 13 further comprising conducting the reaction in the presence of vinyl siloxane.

20. A method according to claim 12 wherein predominantly cross-linked structure is formed by separately extruding the vinyl- and hydride-containing silicones into separate portions of said thermoplastic matrix, mixing the portions, adding a catalyst and [melting the portions together] *melt-processing the mixture* so as to react the vinyl- and hydride-containing silicones.

21. A method according to claim 12 wherein predominantly cross-linked structure is formed by extruding together the vinyl- and hydride-containing silicones into said thermoplastic matrix in the presence of a platinum catalyst and a fugitive inhibitor and [melt-mixing] *melt-processing* the resultant mixture.

22. A method according to [claims] *claim* 20 [or 21] wherein the vinyl-containing silicone contains from about two to about thirty vinyl groups and the hydride-containing silicone contains from two to ten times the equivalent of the vinyl functionality with the ratio of the hydride groups to the vinyl groups being between about 1.2:1 and about 6:1.

*23. A method according to claim 21 wherein the vinyl-containing silicone contains from about two to about 30 vinyl groups and the hydride-containing silicone contains from two to ten times the equivalent of the vinyl functionality with the ratio of the hydride groups to the vinyl groups being between about 1.2:1 and about 6:1.*

*24. A process according to claim 10 wherein said melt-processing comprises melt-mixing said silicone component and said matrix.*

*25. A process according to claim 15 wherein said melt-processing comprises melt-mixing.*

*26. A process according to claim 20 wherein said melt-processing comprises melting said portions of the mixture together.*

*27. A process according to claim 21 wherein said melt-processing comprises melt-mixing.*

*28. A melt processing composition comprising a polymeric thermoplastic matrix, a hydride group-containing silicone, and a component which will react with said hydride group-containing silicone, said silicone and said component being selected and present in sufficient amounts to react with each other by vulcanization within said polymeric thermoplastic matrix to form a silicone pseudo-interpenetrating polymer network, said vulcanization of said silicone and said component being initiated during thermoplastic melt-processing of said composition.*

*29. A composition according to claim 28 wherein said silicone network comprises about 1 to about 40 weight percent of the composition.*

*30. A composition according to claim 28 wherein said thermoplastic matrix is selected from the group consisting of polyamides, thermoplastic polyurethanes, bisphenol A polycarbonates, and polyacetals.*

*31. A composition according to claim 28 wherein said component which will react with said hydride group-containing silicone comprises a polymeric silicone containing at least one unsaturated group.*

*32. A composition according to claim 31 wherein said unsaturated group comprises a vinyl group.*

*33. A composition according to claim 32 forming a predominantly chain-extended structure wherein said vinyl-containing silicone contains from about 2 to about 4 vinyl groups and wherein said hydride group-containing silicone contains 1 to 2 times the equivalent of said vinyl-containing silicone with the ratio of said hydride groups to said vinyl groups being between about 1.2:1 and about 6:1.*

*34. A composition according to claim 32 wherein the vinyl-containing silicone has two vinyl groups in terminal positions.*

*35. A composition according to claim 32 forming a predominantly cross-linked structure wherein said vinyl-containing silicone contains from about 2 to about 30 vinyl groups and said hydride group-containing silicone contains from 2 to 10 times the equivalent of said vinyl-containing silicone with the ratio of the hydride groups to the vinyl groups being between about 1.2:1 and about 6:1.*

*36. A composition according to claim 31 wherein said silicone network further comprises constituents selected from the group consisting of methyl groups, phenyl groups, longer chain alkyl groups or cyanopropyl groups.*

*37. A composition according to claim 28 wherein said melt-processing comprises melt-mixing.*

*38. A composition according to claim 28 further comprising a catalyst to initiate said vulcanization.*

* * * * *